United States Patent [19]

Johnson

[11] 4,258,953
[45] Mar. 31, 1981

[54] DRY BULK HOPPER HAVING AN IMPROVED SLOPE SHEET

[76] Inventor: Ronald D. Johnson, 3516 W. 97th Pl., Leawood, Kans. 66208

[21] Appl. No.: 964,585

[22] Filed: Nov. 29, 1978

[51] Int. Cl.³ .............................................. B60P 1/56
[52] U.S. Cl. .................................... 298/27; 105/248; 280/5 E; 296/15
[58] Field of Search ...................... 298/24, 27; 296/15; 105/247, 248, 358, 364; 280/5 E; 222/566; 52/192, 197

[56] References Cited

U.S. PATENT DOCUMENTS

| | | | |
|---|---|---|---|
| 1,313,361 | 8/1919 | White | 105/248 |
| 1,533,862 | 4/1925 | Hyle | 105/248 |
| 2,789,739 | 4/1957 | Aller | 105/247 X |
| 3,139,286 | 6/1964 | Johnson | 105/248 X |
| 3,187,684 | 6/1965 | Ortner | 105/248 |

Primary Examiner—Stephen G. Kunin
Assistant Examiner—Terrance L. Siemens
Attorney, Agent, or Firm—Schmidt, Johnson, Hovey & Williams

[57] ABSTRACT

The hopper body is elongated and is provided with a normally lowermost discharge outlet lying along the longitudinal axis of the body as viewed from the top thereof. The interior of the body forms a slide surface for the dry bulk products contained therein, and such surface is outwardly arcuate throughout substantially the total expanse thereof for structural rigidity and unobstructed longitudinal flow. Along the center line or longitudinal axis of the body, the surface presents a pair of opposite end strips converging downwardly toward said outlet and parallel to such axis as viewed from the top thereof. Such strips are so disposed with respect to a horizontal plane that the resultant product fall line of any point within each strip is less than 45° but greater than 25°. While such an angle might be less than the angle of slide of the particular product contained within the body, the remaining portions of the product slide surface on the interior of the body have resultant product fall lines that are equal to or exceed 45° such that the force of product at such other portions of the surface attempting to discharge toward the outlet will tend also to cause discharging forces and movement of the product located along the less steeply angled strips.

5 Claims, 10 Drawing Figures

DRY BULK HOPPER HAVING AN IMPROVED SLOPE SHEET

TECHNICAL FIELD

This invention relates to the field of hopper bodies used in the storage and distribution of dry bulk products, such bodies commonly being utilized in the form of enclosed, over-the-road truck trailers or rail cars for attachment to locomotives.

BACKGROUND ART

My earlier U.S. Pat. No. 3,139,286 issued June 30, 1964 and titled "Tank Truck Hopper Body Formed with Arcuate Surfaces" discusses at length the attributes of having an enclosed tank body of the aforementioned type characterized by the formation of the enclosing walls thereof by the intersection and interconnection of a series of arcuate surfaces. One primary advantage of such an arrangement is that in lieu of heavy gauge flat plates inclined at the necessary angle for unloading of the free-falling product, lighter gauge metals formed for the proper arcuate configuration may be employed because such arcuate configuration better distributes the stresses due to internal forces, thereby permitting the overall weight of the tank body to be considerably lighter than prior constructions per cubic foot of volume.

Thus, from my aforesaid earlier patent, the attributes of a properly arcuately formed hopper body have become well known and accepted in the art, and yet, even those tank bodies constructed in accordance with the teachings of my aforesaid patent have been limited insofar as their carrying capacity is concerned as a result of the angle selected for the slope sheet of the tank body along the longitudinal axis thereof.

SUMMARY OF THE PRESENT INVENTION

In my aforesaid patent, the opposite ends of the transversely arcuate body along its center line converge downwardly toward the outlet at respective 45° angles with a horizontal plane. This particular angle was selected because it was standard industry practice to use a slope angle of 45° on discharging hopper surfaces for dry bulk products.

The present invention is based upon the recognition and discovery that while product particles at the end surfaces along the longitudinal axis of the transversely arcuate body are indeed exposed to a certain slope angle corresponding to the slope of the end surface along said longitudinal axis, the resultant slope or "fall line" experienced in other planes by product particles up along the sides of the tank body is likely to be substantially greater. While such "outboard" particles are subjected to a gravitational force vector paralleling the longitudinal axis of the body which is at precisely the same slope as the end surfaces of the body along such longitudinal axis, at the same time the force of gravity acting upon the outboard product particles can be resolved into countless other vertical planes disposed obliquely of said longitudinal axis. In many of those oblique planes the force of gravity is resolved into a slope angle along the hopper surface that substantially exceeds the angle along the center line of the body, and in some certain plane the slope for a given point will be at its greatest magnitude (hereinafter referred to as the "resultant product fall line") so that the force of gravity acting downwardly along the surface in that particular plane will have its greatest tendency to make the particle slide. Although the resultant product fall line for each particle is ever-changing as the particle moves increment-by-increment down the arcuately sloping surface, each resultant fall line at each descending point will exceed the corresponding resultant fall line of the particles along the end surfaces of the body until the particle reaches such centrally disposed end surfaces. Thereupon the resultant fall line will correspond to the angle of slope of the end surfaces.

The net effect of this discovery is to enable the end surfaces of the transversely arcuate body to be disposed at much shallower angles than has heretofore been thought possible. Suppose, for example, that the angle at which a particular product would begin sliding along a surface by gravity (hereinafter referred to as its "angle of slide") is 45°. Prior thinking would require that the converging end surfaces of the tank body could not be disposed at less than 45° angles with respect to the horizontal plane. In fact, however, it has now been discovered that the end surfaces can be lowered substantially below 45° because, even though there is indeed a strip along the end surfaces wherein the resultant product fall line in any vertical plane (parallel to the center line or otherwise) is less than 45° and thus less than the angle of slide of the product, at all other portions of the arcuate slide surface outboard of such strip, the resultant product fall line will be equal to or exceed the angle of slide (45°) in some vertical plane. Thus, a particle exposed to the necessary product fall line of at least 45° will tend to move through an increment of travel in that direction toward the discharge point.

Although the product along the aforementioned lower angled strips of the end surfaces may not of its own accord gravitate toward the discharge outlet, it has been found that this reluctance to discharge tends to be overcome by the force and movement of that product which has a sufficiently steep fall line outside the strips. In other words, as long as the slope of the end sections along the center line of the body does not fall below approximately 25°, it has been recognized that for a large number of products, the gravitational force and movement of the products on the steeper side surfaces of the body will be sufficient to induce the product lying along the aforementioned central strips to gravitate down such strips and out the outlet.

This discovery has a very great impact on a number of things. For example, broadly speaking, it gives rise to a larger volume tank body because of the lower slope on the end surfaces. More importantly, it provides a larger volume tank body within the same height, width and road clearance limitations so that the cubic space available as a result of the dimensional restrictions put on over-the-road trailer bodies of this type can be utilized more fully then heretofore thought possible. This, of course, paves the way for countless other benefits such as, for example, savings in man hours as a result of bigger payloads and fewer trips to move a given volume of product, fuel and energy conservation, decreased mileage as a result of fewer trips, reduced equipment wear as a result of lower over-the-road mileage, etc.

As an adjunct to the above, it has also been found helpful when the slope angle of the end surfaces is dropped substantially below 45° to have the funnel at the discharge outlet, if indeed such funnel is used, maintained with its product fall lines in those portions registering with the end surfaces substantially exceeding that of the end surfaces. Thus, if, for example, the end surfaces are disposed at 30°, the fall lines of the end portions of the funnel should be preferably around substantially 45°.

It has been found that this abrupt change in slope adjacent the discharge point for the products has the effect of accelerating discharge at that particular location, and this accelerated movement seems to aid in relieving the reluctance of products along the areas of shallow angles to discharge properly. Hence, this feature also is an important aspect of the present invention.

DETAILED DESCRIPTION

Figure 1:
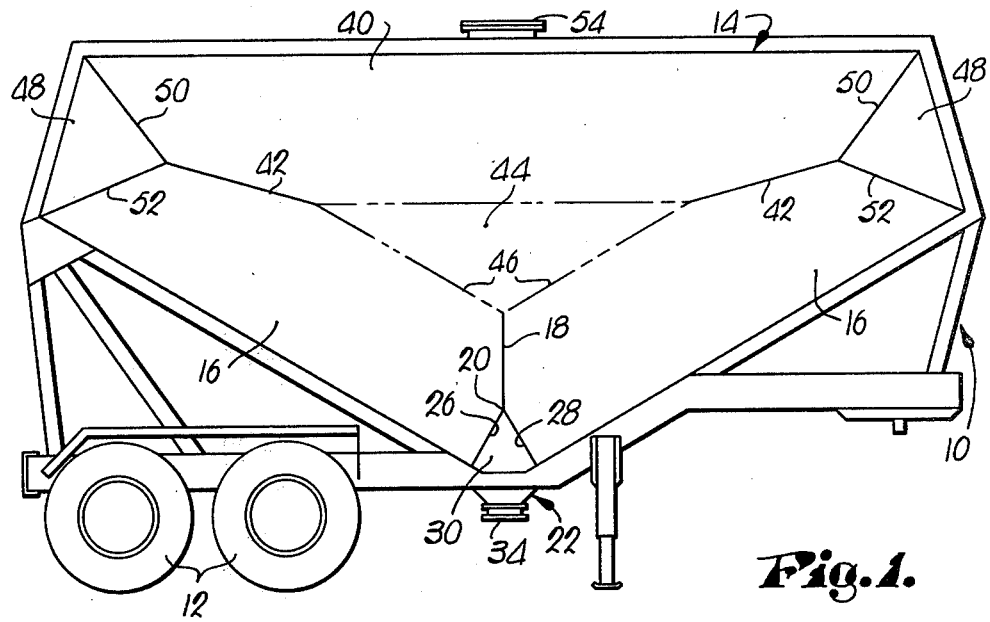
FIG. 1 is a side elevational view of a semi-trailer incorporating a tank body constructed in accordance with the principles of the present invention.
Figure 2:
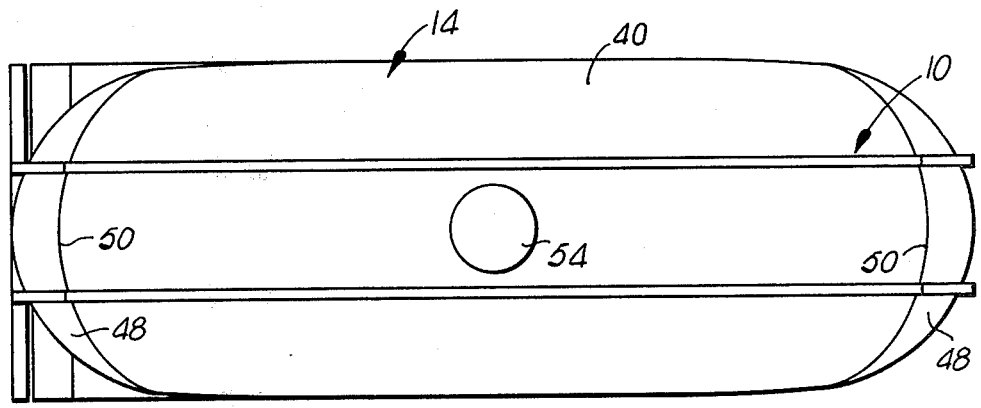
FIG. 2 is a top plan view thereof.
Figures 3, 6:
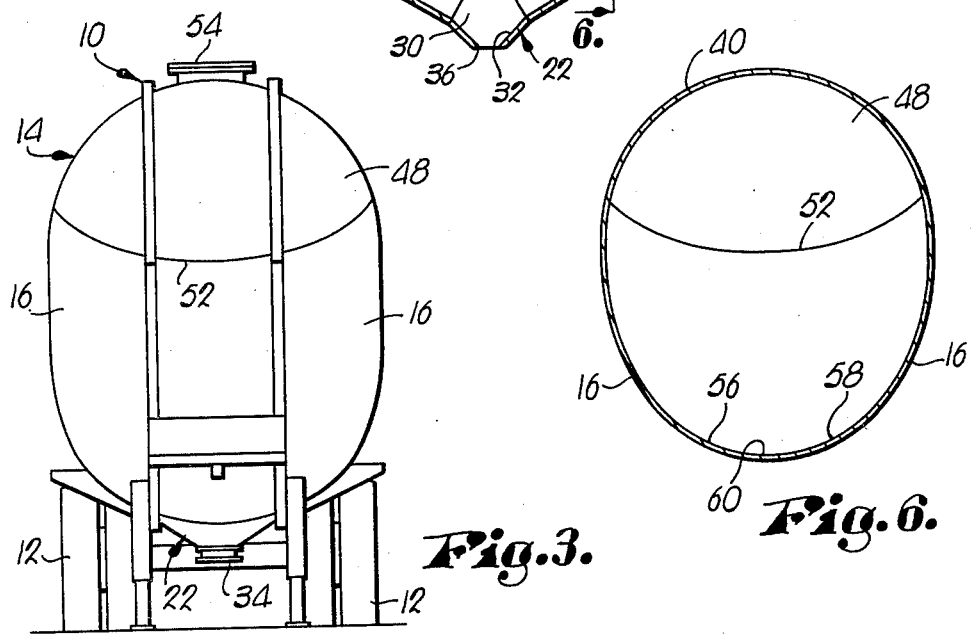
FIG. 3 is a front end elevational view thereof.
FIG. 6 is a vertical, transverse, cross-sectional view of the tank body taken substantially along line 6—6 of FIG. 4.

The semi-trailer of FIGS. 1, 2 and 3 includes a framework 10 carried by wheels 12 for over-the-road travel. A hopper body 14 in the nature of an enclosed tank is mounted within the framework 10 for support thereby and includes a pair of downwardly and inwardly inclined opposing walls 16 that are transversely arcuate as a result of their being formed as sectors of cylinders. The walls 16 are cut and joined together along their vertical line of mutual intersection 18 which is located at the midpoint of the body 14 in a fore and aft direction. The line of intersection 18 terminates at a lower point 20, at which location a specially formed funnel 22 is located so as to define an outlet 24 for products contained within the body 14.

Figure 4:
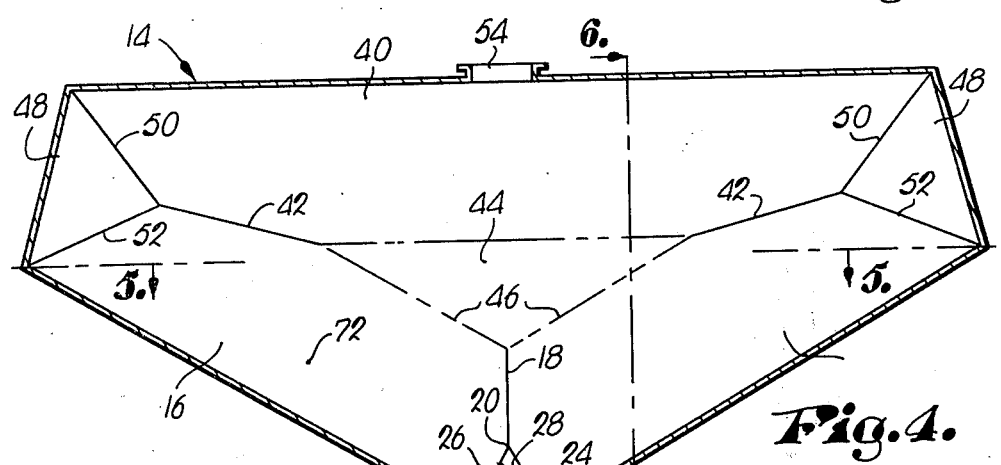
FIG. 4 is a longitudinal, vertical, cross-sectional view of the tank body.

From the point 20 downwardly, the opposite inner end edges 26 and 28 of the walls 16 diverge and are each disposed at right angles to the longitudinal axis of their respective walls 16. Thus, the funnel 22 is provided with upper, laterally disposed, generally triangular portions 30 on opposite sides of the body 14 which fit between the end edges 26 and 28, and with a lower, generally conical portion 32 which projects downwardly beyond the lowermost termination of the edges 26 and 28. The opposite, fore-and-aft ends of conical portion 32 are disposed at a slope substantially greater than the slope of the walls 16 along the longitudinal axis of the body 14 and, preferably, at substantially 45° as shown in FIG. 4. A fitting 34 (FIGS. 1 and 3) is provided at the aperture 36 (FIG. 4) at the lower termination of the conical portion 32 for the purpose of closing off the aperture 36 and providing a means by which an unloading conduit (not shown) may be coupled with the funnel 22.

Figure 5:
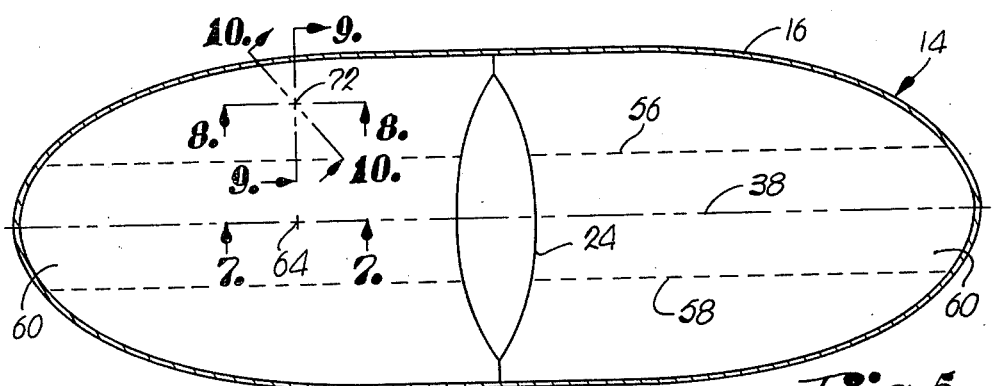
FIG. 5 is a horizontal, cross-sectional view of the tank body taken substantially along line 5—5 of FIG. 4.

As aforementioned, the body 14 is indeed elongated in a fore-and-aft direction with respect to the normal path of travel thereof, and thus is provided with a longitudinal axis denoted by the numeral 38 in FIG. 5. The body 14 is symmetrical with respect to said axis 38 such that axis 38 also defines the center line of the body 14 in a fore-and-aft direction.

The walls 16, when viewed in transverse cross section, extend through arcs of approximately 180° so that they present both the lower ends of the body 14 and the lower sides thereof. The top of the body 14 is defined primarily by a wall 40 in the nature of a third cylinder sector inverted with respect to the sectors of walls 16 but likewise extending through an included arc of approximately 180° when viewed in transverse cross section. The walls 16 and 40 are cut away along their lines of intersection 42 at the side of the body 14 and are welded at such locations, and a downward, triangular extension 44 of the wall 40 on each side of the latter projects beyond the intersection line 42 in a generally vertical plane until it intersects the walls 16 along lines of intersection 46 extending parallel to the slope of the walls 16 along the center line 38. The extension 44 and the walls 16 are welded together along the lines 46.

Completing the body 14 are a pair of opposite end sections 48 that converge slightly toward one another in an upward direction as viewed in FIG. 1 and which fit between the upper wall 40 and the lower walls 16 at the respective outer end edges thereof so as to define lines of intersection 50 and 52 respectively whereat such structures are welded together. As illustrated quite clearly in the drawings, the end sections 48 wrap slightly around the front and rear of the body 14 to project in a fore-and-aft direction as portions of the sides of the body 14 because of the way in which the walls 40 and 16 are cut away at such locations.

A conventional type closure 54 is arranged over a central opening in the top wall 40, and suitable means (not shown) may be employed for pressurizing the interior of the tank body 14 for pressure-delivery of the materials through a conduit hooked to the fitting 34.

The interior of the body 14, particularly as defined by the interior of the walls 16, presents a product slide surface that is directed toward the outlet 24 for gravitation of product along such surface during discharge from the body 14. As a result of the transversely outwardly arcuate configuration of the walls 16, the slide surface itself is also transversely outwardly arcuate throughout at least a major part of its expanse. The walls 16 present converging, opposite end strips of the slide surface along the longitudinal axis 38 as viewed from the top thereof in FIG. 5, and although such strips have no visually perceivable lateral terminations, for purpose of clarity and a full understanding of the present invention, such strips may be visualized as lying between, for example, points 56 and 58 of the walls 16 as viewed in transverse section in FIG. 6. Thus, the strips themselves may be described as that lineal although outwardly arcuate area 60 between the points 56 and 58. When the body 14 is viewed in horizontal cross section as in FIG. 5, the points 56 and 58 become lengthened into the phantom lines 56 and 58 defining the lateral margins of the strips 60.

Although the lines 56 and 58 are parallel to one another in the illustrated cylindrical embodiment of walls 16, such relationship may, manifestly, vary depending upon the particular outwardly arcuate configuration selected for the walls 16. In this regard, in whole or in part, the walls 16 may be elliptical, conical, any combination of cylindrical, elliptical and conical, or otherwise "transversely outwardly arcuate" and still fall within the teachings and spirit of the present invention.

In accordance with the present invention, the strips 60 define areas of the end surfaces of the body 14 within which the resultant product fall line at any point on the surface of wall 16 within the strips 60 is less than 45°. The width of the strips 60, i.e., the lateral positions of the extremities 56 and 58, thus varies according to the slope of the walls 16 along the longitudinal axis 38. In the illustrated embodiment, the angle of slope with respect to a horizontal plane of the walls 16 along the longitudinal axis 38 is 30°, although it is within the scope of the present invention to have such angle vary between 25° as a minimum and slightly less than 45° as a maximum, it being understood, of course, that both of the walls 16 are disposed at the same slope angle along the center line 38, although the particular angle selected for both walls 16 may range between the values above set forth.

Figure 7:
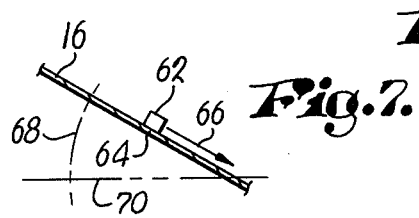
FIG. 7 is an enlarged, free-body diagram of a product particle located on one end surface of the tank body, the diagram being shown in the nature of a longitudinal, cross-sectional view taken along line 7—7 of FIG. 5 parallel to the longitudinal axis of the tank body.

By examining FIGS. 5 and 7, which show a particle 62 located at point 64 along the center line 38, it is easy to see that the resultant product fall line indicated by the vector 66 must be parallel to the axis 38 as viewed from the top of the body 14. The resultant product fall line of the particle 62 in FIG. 7 is defined by the angle 68 measured between a horizontal plane 70 and the vector 66 which represents the force of gravity acting against the particle 62 down the surface of wall 16 and in the particular vertical plane chosen. As set forth above, angle 68, i.e., the product fall line, for particle 62 will be something less than 45°, e.g., between 25° and slightly less than 45° (here illustrated as 30°).

Examining a point 72 laterally outboard from the point 64 in FIG. 5 shows a considerably different picture depending upon the vertical plane in which point 72 is examined. For example, although in FIG. 8 a particle 74 at point 72 has a force vector 76 in that particular plane which is disposed at precisely the same angle 78 with respect to the horizontal 80 as the particle 62 of FIG. 7, this is due to the fact that the planes of FIGS. 7 and 8 are parallel to one another and to the longitudinal axis 38 as viewed from the top of the body 14.

Figure 9:
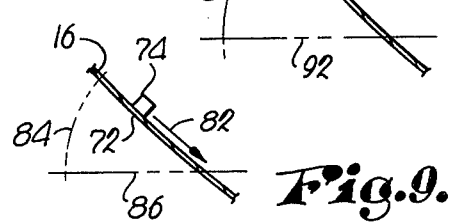
FIG. 9 is a free-body diagram through the particle of FIG. 8 but taken along line 9—9 of FIG. 5 which is disposed at right angles to the longitudinal axis of the tank body.

However, if the viewing plane of the particle 74 at point 72 is made at right angles to the longitudinal axis 38 as in FIG. 9, it is found that the force vector 82, and thus the fall line of the particle 74, is much greater in this plane wherein the vector 82 lies at an angle 84 with the horizontal 86.

Figure 8:
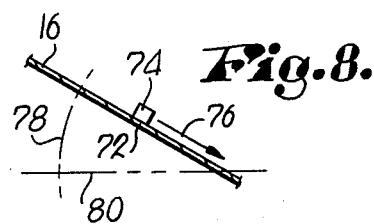
FIG. 8 is a similar free-body diagram of a particle disposed on one of the side surfaces of the tank body, the cross-section being taken along line 8—8 of FIG. 5 parallel to the longitudinal axis of the tank body.
Figure 10:
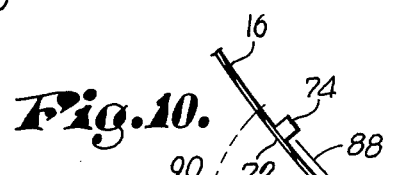
FIG. 10 is a third free-body diagram through the particle of FIGS. 8 and 9 but with the cross-sectional line 10—10 of FIG. 5 disposed obliquely with respect to the longitudinal axis of the tank body so as to illustrate that a steeper resultant product fall line exists for the same product particle in the plane of FIG. 10—10 than in the planes of 8—8 and 9—9.

Furthermore, in some vertical plane between those of FIGS. 8 and 9, e.g., the oblique plane of FIG. 10, the particle 74 will have its force vector 88 lying at a still greater angle 90 with the horizontal 92, exceeding both the angle 78 in the plane of FIG. 8 and the angle 84 in the plane of FIG. 9.

Thus, the particle 74 at point 72 wants to move down the slide surface of wall 16 in the direction of vector 88, and this downwardly directed force, coupled with similar forces of the millennium of other particles disposed laterally outwardly of the strip 60, has the effect of urging the particles within the strip 60 to likewise move toward the outlet 24 and be discharged.

The higher on the side of the wall 16 that the fall line is examined, the more nearly the fall line will approach a vertical disposition because, as shown clearly in FIG. 6, for example, the wall 16 likewise approaches a vertical disposition as its upper lines of intersection 42 and 46 with the wall 40 are approached. Thus, a particle along the surface of the wall 16 has a resultant product fall line that initially projects down in a fairly vertical direction. But then, the fall line is turned as the strip 60 is approached, until it becomes more parallel to the axis 38 as the particle enters the strip 60. In a full body 14, the mass of particles along the strips 60 tend to flow in parallel straight lines toward the outlet 24 which would tend to inhibit their dischargeability at low slope angles. However, the action of the particles outside strips 60, tending to move in the curved paths above described, has an eroding effect on particles within strips 60 and makes them also move.

The curvature of the sliding surface for the product is thus quite important or, stated differently, the fact that such surface is transversely outwardly arcuate as opposed to simply being flat, sloping plates is a critical part of the present invention. To this end, if all of the product-sliding surfaces were disposed at an angle below the angle of slide of the product, then, of course, the product would not gravitate to the outlet 24 and discharge therefrom. But due to the fact that the product-sliding surface is indeed transversely outwardly arcuate, the slope of the sliding surface along the longitudinal axis 38 is not the limiting factor it has heretofore been commonly thought to be.

Of further special significance, as mentioned earlier, is the fact that the opposite fore-and-aft ends of the conical portion 32 of the discharge funnel 22 are disposed at a substantially greater angle than the sliding surface along the center line 38. It is believed that this abrupt change in slope angle at the point of discharge has an acceleration effect upon the discharging particles at the outlet 24, and such acceleration is highly desirable for several reasons. For example, the product at the point of discharge 24 is being restricted because of decreasing flow space. Thus, it is necessary to counteract this restrictive effect by accelerating the product to maintain overall consistent flow. This, then, combines with the downward efforts exhibited by the particles outside of the strip 60 to discharge so as to overcome the reluctance of the particles within the strip 60 to move to the outlet 24 and be discharged therefrom.

In lieu of providing the funnel 22 with steep end portions as above described, the desired product acceleration could be obtained by providing suitable aeration means or agitating means (not shown) at the outlet 24. Thus, the steep end portions of funnel 22, aeration means and agitating means comprise alternative forms of "accelerating means" for the product.

Preferably, the fall line or slope of the fore-and-aft ends of the conical portion 32 is substantially 45° and, thus, if the angle of slope of the sliding surface along the longitudinal axis 38 is at the lower end of the range, e.g., 25°, the differential in slopes between the ends of conical portion 32 and the sliding surface along the longitudinal axis 38 will be quite substantial. On the other hand, if the slope of the sliding surface along the center line 38 is at the upper end of the range, e.g., 44°, the differential will not be as great, but, by the same token, the need for such differential is not as great.

It is to be recognized, of course, that the principles of the present invention as hereinabove set forth have been disclosed with respect to but one embodiment. The principles and concepts could clearly be embodied in other forms without departing from the spirit thereof, e.g., instead of only a single point of discharge, the tank body 14 could be so configured as to have two or more gravity dump points.

I claim:

1. An elongated hopper body for dry bulk products, said body including:

means defining a normally lowermost outlet located on the longitudinal axis of the body as viewed from the top thereof;

a product slide surface formed by the interior of said body and directed toward said outlet for gravitation of product along said surface during discharge from the body, said surface being transversely outwardly arcuate throughout at least a major part of its expanse and including a pair of opposite, transversely outwardly arcuate end strips mutually converging toward said outlet along said longitudinal axis of the body as viewed from the top of the latter, said strips each having a resultant product fall line of less than 45° but greater than 25°, and the remaining portions of said surface having resultant product fall lines equal to or exceeding 45°, the intersections of said strips with said remaining portions of the surface along the longitudinal extremities of the strips being arcuate continuations of said strips and having resultant product fall lines not less than the resultant product fall line of said strips.

2. A hopper body as claimed in claim 1, wherein said outlet is provided with means for accelerating particles of the product.

3. A hopper body as claimed in claim 2, wherein said accelerating means comprises a funnel depending from the outlet and having opposite ends wherein resultant product fall lines converging downwardly from opposite ones of said strips substantially exceed the resultant product fall line in said strips along said longitudinal axis.

4. A hopper as claimed in claim 3, wherein the resultant product fall lines in said ends of the funnel are substantially 45°.

5. A hopper body as claimed in claim 1, wherein said product slide surface is at least partially formed by a pair of downwardly and inwardly inclined cylinder sectors presenting opposite end and side portions of the body, said sectors being joined along mutual lines and having longitudinal, centrally disposed portions that define said strips.

* * * * *